United States Patent
Fatma et al.

(10) Patent No.: US 11,163,942 B1
(45) Date of Patent: Nov. 2, 2021

(54) SUPPORTING DOCUMENT AND CROSS-DOCUMENT POST-PROCESSING CONFIGURATIONS AND RUNTIME EXECUTION WITHIN A SINGLE CARTRIDGE

(71) Applicant: International Business Machines Corporation, Armonk, NY (US)

(72) Inventors: Ishrat Fatma, Millburn, NJ (US); Sandhya Nayak, Jersey City, NJ (US); Scott Carrier, New Hill, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/984,259

(22) Filed: Aug. 4, 2020

(51) Int. Cl.
*G06F 17/00* (2019.01)
*G06F 40/169* (2020.01)
*G06F 40/279* (2020.01)

(52) U.S. Cl.
CPC .......... *G06F 40/169* (2020.01); *G06F 40/279* (2020.01)

(58) Field of Classification Search
CPC ............................. G06F 40/169; G06F 40/279
See application file for complete search history.

(56) References Cited

U.S. PATENT DOCUMENTS

| | | | |
|---|---|---|---|
| 10,558,754 B2* | 2/2020 | Razack | G06N 20/00 |
| 2006/0052945 A1 | 3/2006 | Rabinowitz et al. | |
| 2007/0094188 A1 | 4/2007 | Pandya et al. | |
| 2007/0178501 A1 | 8/2007 | Rabinowitz et al. | |
| 2008/0201280 A1 | 8/2008 | Martin et al. | |
| 2008/0288862 A1* | 11/2008 | Smetters | G06F 40/117 715/255 |
| 2009/0287685 A1* | 11/2009 | Charnock | G06F 16/38 |
| 2012/0030553 A1* | 2/2012 | Delpha | G06F 40/169 715/205 |
| 2015/0100588 A1* | 4/2015 | Allen | G06F 16/243 707/748 |
| 2015/0278764 A1* | 10/2015 | Patil | G06N 20/00 705/301 |
| 2016/0098456 A1* | 4/2016 | Contreras | G06F 40/169 705/3 |

(Continued)

OTHER PUBLICATIONS

IBM, "Annotator for Clinical Data, Customizing," URL: https://cloud.ibm.com/docs.wh-acd?topic=wh-acd-customizing, Last Updated: Apr. 12, 2019, Retrieved: May 2, 2020, 3 pages.

(Continued)

*Primary Examiner* — Laurie A Ries
(74) *Attorney, Agent, or Firm* — Cantor Colburn LLP; Ryan Lewis (57) ABSTRACT

Aspects of the disclosure include receiving, by a processor, a plurality of documents, each document in the plurality of documents comprising metadata, defining, by the processor, a target attribute comprising a set of annotations and a set of cross-document configuration requirements, ingesting the plurality of documents based on the target attribute to identify one or more annotations from the set of annotations in the plurality of documents that comply with the set of cross-document configuration requirements, storing in a memory, during the ingesting the plurality of documents, the identified one or more annotations, and returning the identified one or more annotations to a user.

14 Claims, 5 Drawing Sheets

(56) References Cited

U.S. PATENT DOCUMENTS

| | | | |
|---|---|---|---|
| 2016/0359894 A1* | 12/2016 | Andrejko | G06F 40/169 |
| 2018/0034879 A1* | 2/2018 | Chegini | H04L 65/4092 |
| 2018/0089381 A1 | 3/2018 | Allen et al. | |
| 2018/0089568 A1 | 3/2018 | Allen | |
| 2018/0137249 A1 | 5/2018 | Eggebraaten et al. | |
| 2019/0018904 A1* | 1/2019 | Russell | G06F 16/24578 |
| 2019/0251182 A1* | 8/2019 | Ray | G06F 40/194 |
| 2020/0133964 A1* | 4/2020 | Lee | G06F 16/258 |
| 2020/0293712 A1* | 9/2020 | Potts | G16H 10/60 |
| 2020/0321082 A1* | 10/2020 | Shriberg | G06N 7/005 |
| 2021/0089589 A1* | 3/2021 | Cerino | G06F 40/169 |

OTHER PUBLICATIONS

IBM, "Annotator for Clinical Data, Overview," URL: https://cloud.ibm.com/docs/services/wh-acd?topic=wh-acd-overview, Last Updated: Apr. 1, 2020, Retrieved: May 2, 2020, 4 pages.

* cited by examiner

SUPPORTING DOCUMENT AND CROSS-DOCUMENT POST-PROCESSING CONFIGURATIONS AND RUNTIME EXECUTION WITHIN A SINGLE CARTRIDGE

BACKGROUND

The present invention generally relates to natural language processing, and more specifically, to supporting document and cross-document post-processing configurations and runtime execution within a single cartridge.

Natural language processing (NLP) is a field of computer science, artificial intelligence, and linguistics concerned with the interactions between computers and human (natural) languages. As such, NLP is related to the area of human-computer interaction. Many challenges in NLP involve natural language understanding, i.e. enabling computers to derive meaning from human or natural language input.

NLP is often used to identify concepts in a document and to create metadata regarding the identified concepts. However, when evaluating a set of documents, NLP systems only look to identify concepts on a per document basis. While the document size and scope can vary, most unstructured text include multiple separate documents that may have entities and concepts that are related and can be of interest to a domain expert.

SUMMARY

Embodiments of the present invention are directed to a computer-implemented method for supporting document and cross-document post-processing configurations and runtime execution within a single cartridge. A non-limiting example of the computer-implemented method includes receiving, by a processor, a plurality of documents, each document in the plurality of documents comprising metadata, defining, by the processor, a target attribute comprising a set of annotations and a set of cross-document configuration requirements, ingesting the plurality of documents based on the target attribute to identify one or more annotations from the set of annotations in the plurality of documents that comply with the set of cross-document configuration requirements, storing in a memory, during the ingesting the plurality of documents, the identified one or more annotations, and returning the identified one or more annotations to a user.

Embodiments of the present invention are directed to a system for supporting document and cross-document post-processing configurations and runtime execution within a single cartridge. A non-limiting example of the system includes a processor coupled to a memory, the processor configured to perform receiving, by a processor, a plurality of documents, each document in the plurality of documents comprising metadata, defining, by the processor, a target attribute comprising a set of annotations and a set of cross-document configuration requirements, ingesting the plurality of documents based on the target attribute to identify one or more annotations from the set of annotations in the plurality of documents that comply with the set of cross-document configuration requirements, storing in a memory, during the ingesting the plurality of documents, the identified one or more annotations, and returning the identified one or more annotations to a user.

Embodiments of the invention are directed to a computer program product for supporting document and cross-document post-processing configurations and runtime execution within a single cartridge, the computer program product comprising a computer readable storage medium having program instructions embodied therewith. The program instructions are executable by a processor to cause the processor to perform a method. A non-limiting example of the method includes receiving, by a processor, a plurality of documents, each document in the plurality of documents comprising metadata, defining, by the processor, a target attribute comprising a set of annotations and a set of cross-document configuration requirements, ingesting the plurality of documents based on the target attribute to identify one or more annotations from the set of annotations in the plurality of documents that comply with the set of cross-document configuration requirements, storing in a memory, during the ingesting the plurality of documents, the identified one or more annotations, and returning the identified one or more annotations to a user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
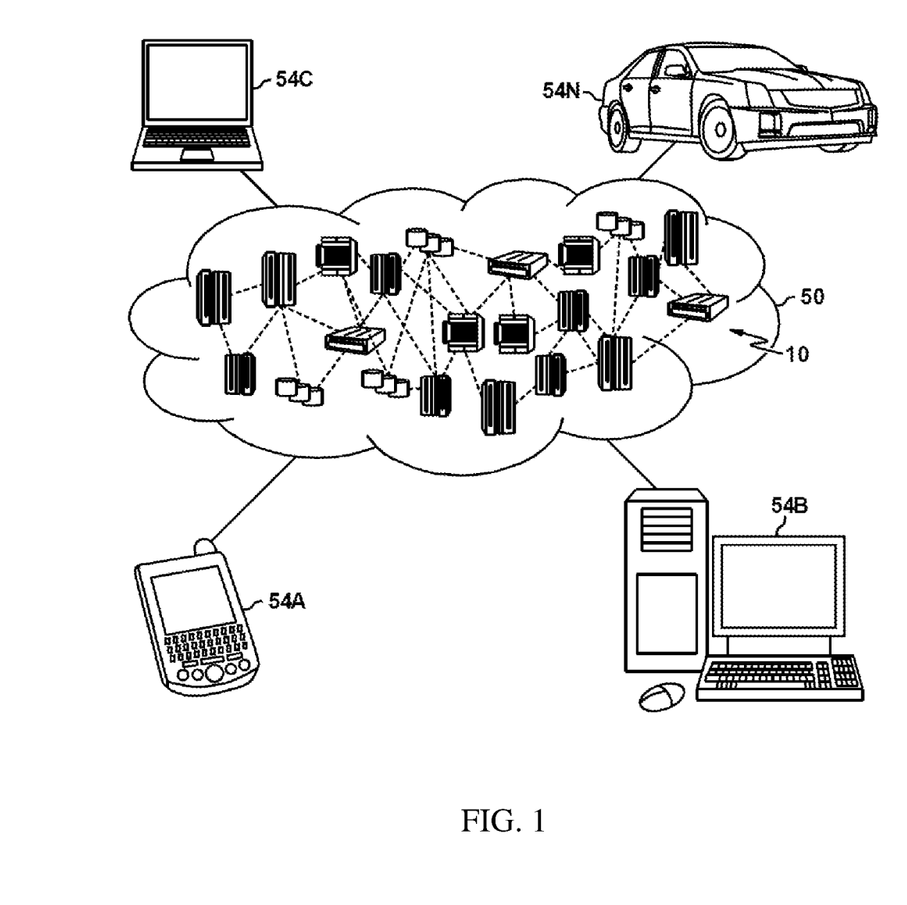
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
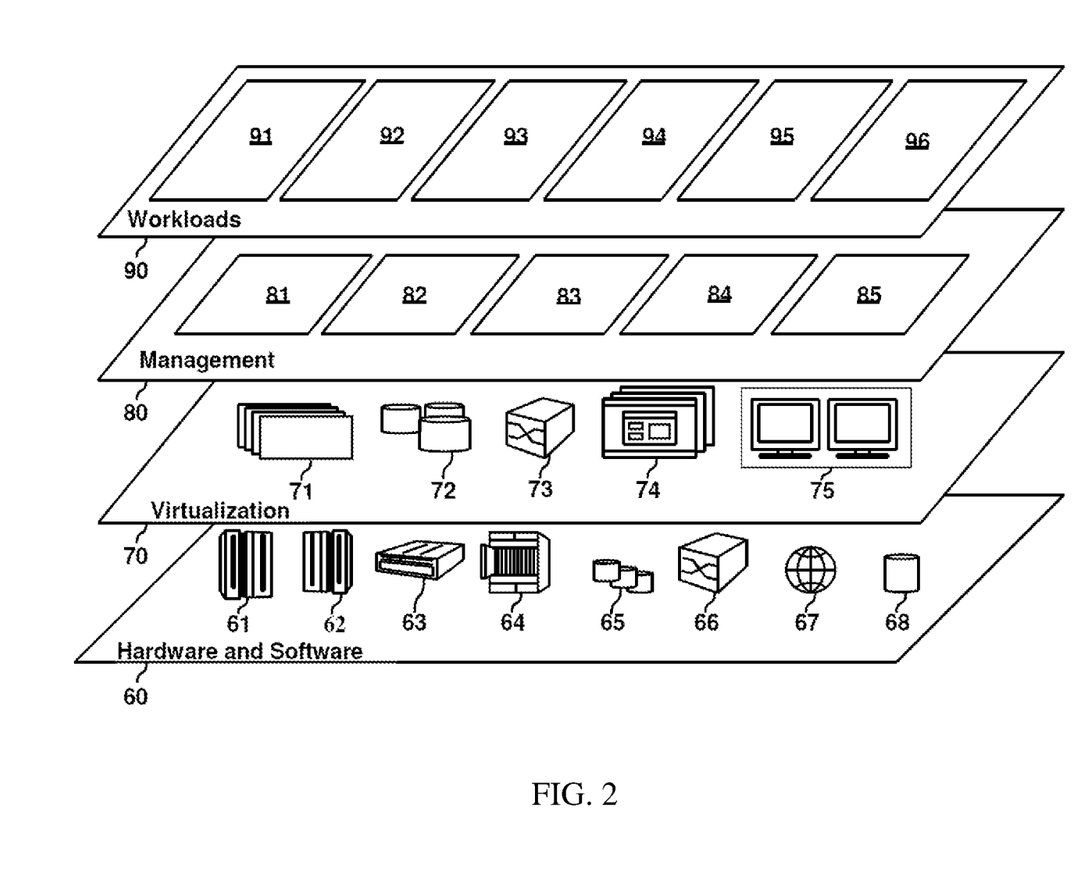
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and supporting document and cross-document post-processing configurations and runtime execution within a single cartridge 96.

Figure 3:
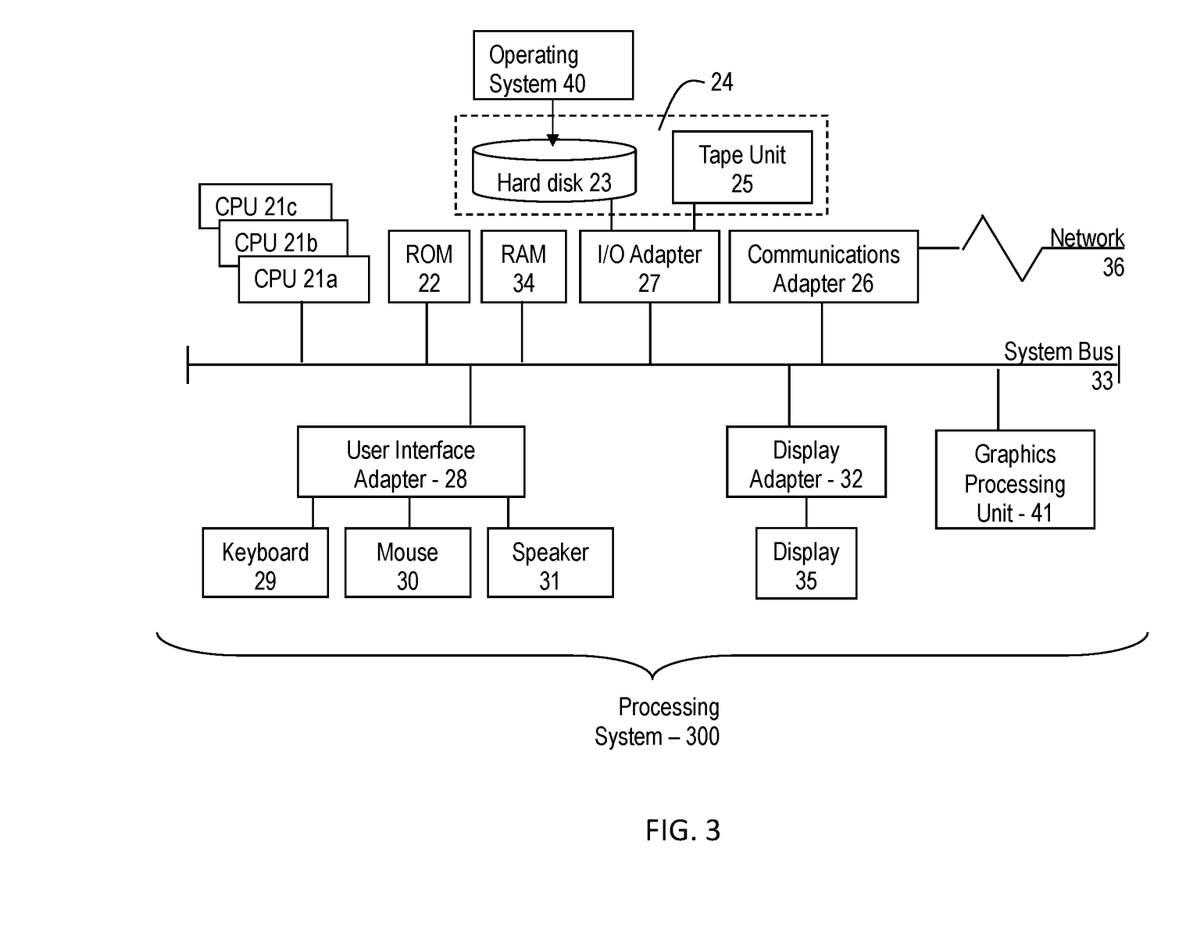
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, for current NLP systems, such as annotator for clinical data (ACD), there is not a way to extract concepts and relationships across multiple documents. Each document, instead, is run individually using a cartridge flow defined by the domain expert and each entity or artifact is extracted per document. If a domain expert did wish to identify concepts related to an entity that is present in separated documents, the domain expert would need to develop and employ complex post-processing logic that would be ran outside the NLP system to combine the extracted concepts to be able to see these relationship patterns. Development and execution of this post-processing task would likely be beyond the skillset of a domain expert using the NLP system.

Turning now to an overview of the aspects of the invention, one or more embodiments of the invention address the above-described shortcomings of the prior art by providing cross-document post-processing configurations and runtime execution within a single cartridge for an NLP system. Aspects of the present invention provide for introducing a way to trigger a new category of attributes based on the discovery of a mix of concepts in multiple documents. This allows for extracting relationships, insights, and conclusions that could be useful in a clinical setting, for example. To achieve this end, a domain expert, setting up an NLP cartridge, can configure a new category of attribute in cartridges which can combine concepts extracted from multiple documents. In addition to defining these set of lower level annotations on which these special (target) attributes can be built upon, domain experts would also define a set of configurations based on the document metadata. The metadata can include, for example, a time window that would help extract the accurate building block annotations appearing in the different documents.

Figure 4:
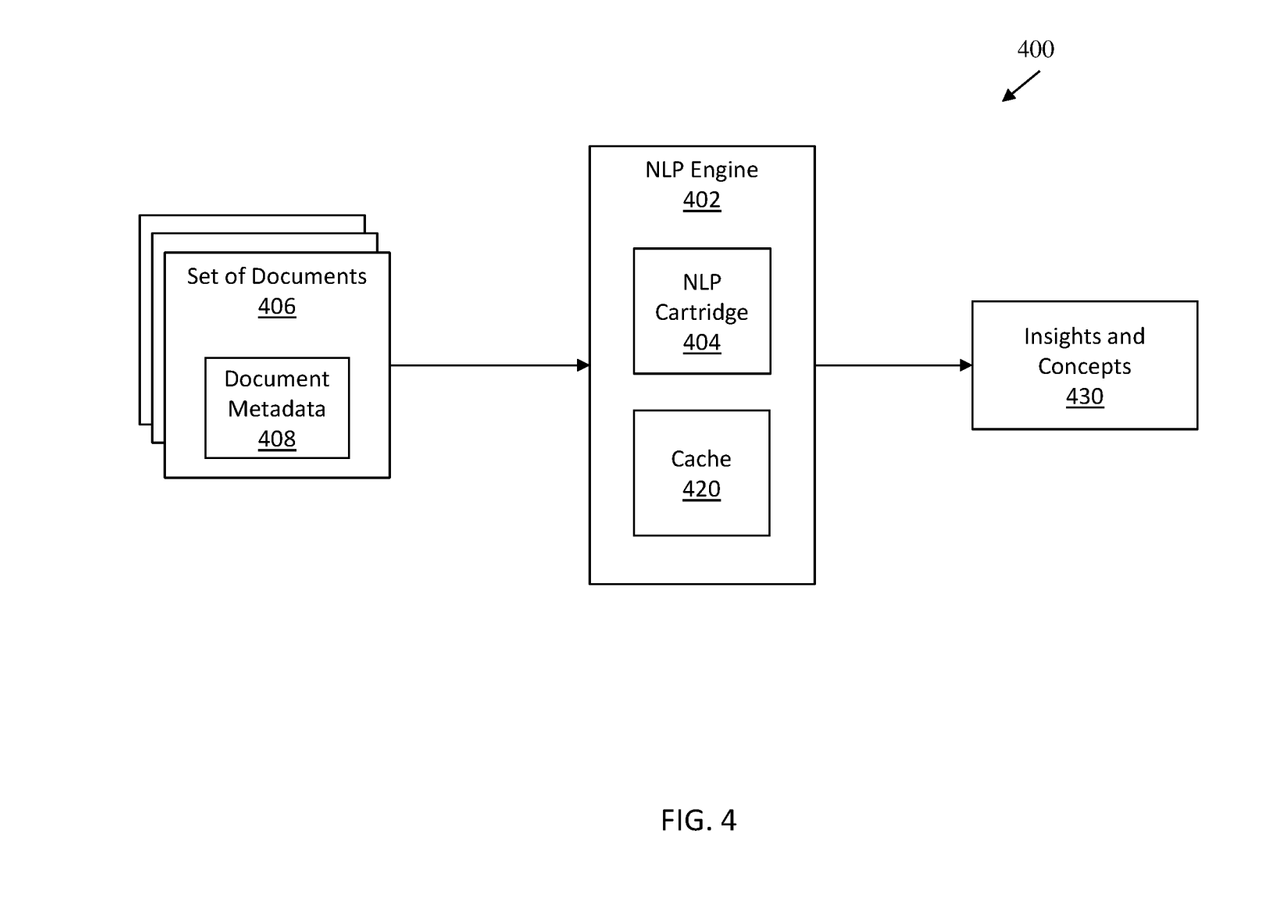
FIG. 4 depicts a block diagram of a system for supporting document and cross-document post-processing configurations according to embodiments of the invention.

Turning now to a more detailed description of aspects of the present invention, FIG. 4 depicts a block diagram of a system for supporting document and cross-document post-processing configurations according to embodiments of the invention. The system 400 includes an NLP engine 402 than can employ an NLP system for processing, annotating, and embedding natural language text in documents. The NLP engine 402 can utilize an NLP cartridge 404 that is defined by a domain-expert operating the NLP system. For example, a healthcare professional may utilize the NLP system for processing medical documents that are unstructured to extract entities or concepts for further review and/or analysis. The healthcare profession (e.g., domain expert) defines the NLP cartridge 404 which is a set of configuration rules for processing any documents and text by the NLP system. As mentioned above, NLP systems typically process documents one at a time and do not support cross-document processing. To address this issue, the system 400 includes an NLP cartridge 404 that includes configuration rules that can define special attributes that are triggered from metadata values and/or a combination of metadata and annotations applied to unstructured content during processing by the NLP engine 402. For example, the NLP cartridge 404 can be configured to look for certain annotations and/or entities within specific document types (e.g., clinical notes, lab results, discharge summaries, etc.). The NLP cartridge 404 can also include time constraints regarding a document date. For example, the NLP processing can look for annotation A in document type B and annotation C in document type D and document types B and D must be within a 1-week time window.

In one or more embodiments of the invention, this special attribute would work off the specific data elements employed within the configuration task as opposed to an annotated document. Given the unique nature of these special attribute configurations, targeted data elements would be cached for their resolution as opposed to annotated documents or document excerpts.

In one or more embodiments of the invention, the NLP engine 402 can receive a set of documents 406 where each document has associated document metadata 408. The set of documents 406 may include, for example, a patient's history, medical records, and pathology reports. The document metadata 408 can include information about the documents such as, for example, document type (e.g., clinical summary, lab results, etc.), date document created, document author, document author type (e.g., doctor, nurse, lab technician, etc.) document size, and the like.

An example use case can include a determination of breast cancer recurrence using a combination of symptoms and lab results. The annotations in the documents can include cancer antigen 15-3 (CA 15-3), cancer antigen 27.29 (CA 27.29), and carcinoembryonic antigen (CEA). These annotations (e.g., test result values) can be taken from document types (metadata) for a CT scan, PET scan, and bone scan tests results. A target attribute such as "BreastCancerMarker" can combine these different concepts that have been detected individually from the documents. The domain-expert can define, in the NLP cartridge 404, a set of lower-level annotations which would be building blocks for this target (special) attribute. This target attribute can also include a defined set of configurations based on the document metadata such as, for example, a window of time between the different documents in which the lower level annotations may appear (PET, CT, etc.). These configurations can be specified in, for example, a YAML file by the domain expert.

When the NLP cartridge 404 is deployed in the NLP engine 402, the configurations are introspected to identify whether any such special attributes are configured. If so, the dependent data elements (e.g., metadata fields, annotations) are extracted for use by the NLP engine 402 in extracting and caching this data in the cache 420 as the set of documents 406 are processed for the given NLP cartridge 404. That is to say, the NLP engine 402 processes any document from the set of documents 406 with the NLP cartridge 404 containing these cross-document configurations and transiently caches these annotations along with the pertinent document metadata. An NLP cartridge 404 is basically a container or collection of NLP-related assets, annotators, and the like for analyzing document content including configuration requirements setting metadata values of interest for the domain-expert.

In one or more embodiments of the invention, as the NLP engine 402 processes the set of documents 406 using the defined NLP cartridge 404 containing these cross document configurations, the NLP engine 402 will transiently cache (i.e., store in the cache 420) these annotations along with the pertinent document metadata defined by these cross-document configuration requirements. A post-processing call is made to the NLP engine 402 to return the insights and concepts 430 gleaned from the cross-document analysis which would be in the form of the annotations that were cached during document processing (ingestion).

In one or more embodiments of the invention, once ingestion of the set of documents 406 has been completed by the NLP engine 402, a user can make a post-process call to the NLP engine 402 referencing the NLP cartridge 404 employed for the document level NLP processing. Depending on the configurations set up in the NLP cartridge 404 such as a time-window of the documents, a pre-post-processing step is employed to define the candidate data elements to be evaluated by the cross-document attribute sets. The cross-document attribute sets are a type of annotation output by a set of rules that look for specific annotations and/or metadata spread across multiple documents. The so-called target attribute can be multiple attributes that include the annotations and cross-document configurations which define these attributes based on annotations and metadata spread out across multiple documents. One stage of this process involves identifying dependent annotations found in the set of documents 406 that were authored within a predefined span of time (e.g., 1 week). Depending on the date this is run, the span of time acts as a moving frame of time in which one or more annotations might appear within multiple time frames (i.e., windows of time). In one or more embodiments of the invention, domain experts could also define configurations that could favor a set of annotations that occur close together in time (e.g., a set of annotations from source documents authored within a day of each other verses occurring further apart). That is to say the configurations can prefer time allotments of annotations what would favor certain attributes over other eligible attributes. In other embodiments, a confidence score can be determined by the NLP engine 402 based on the time frame of which annotations are found such that a higher confidence score would indicate a higher compliance with the configuration rules including the predefined window of time.

In one or more embodiments of the invention, once the dependent annotations have been assigned a time span, the special attribute detection layer acts upon these annotation sets to derive any attributes that have been configured by the domain expert for cross-document attribute detection. Any attributes derived from this post-processing call are returned in the response citing the occurrence of the dependent annotations from which the attribute was derived as well as the pertinent metadata from which they were found. Also, the timestamps of the documents from which the dependent annotations were found can be summarized within the resulting attribute over those documents and output onto a display screen as the special annotations and specific metadata 430 for a user/domain expert.

In one or more embodiments of the invention, the NLP engine 402 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

Figure 5:
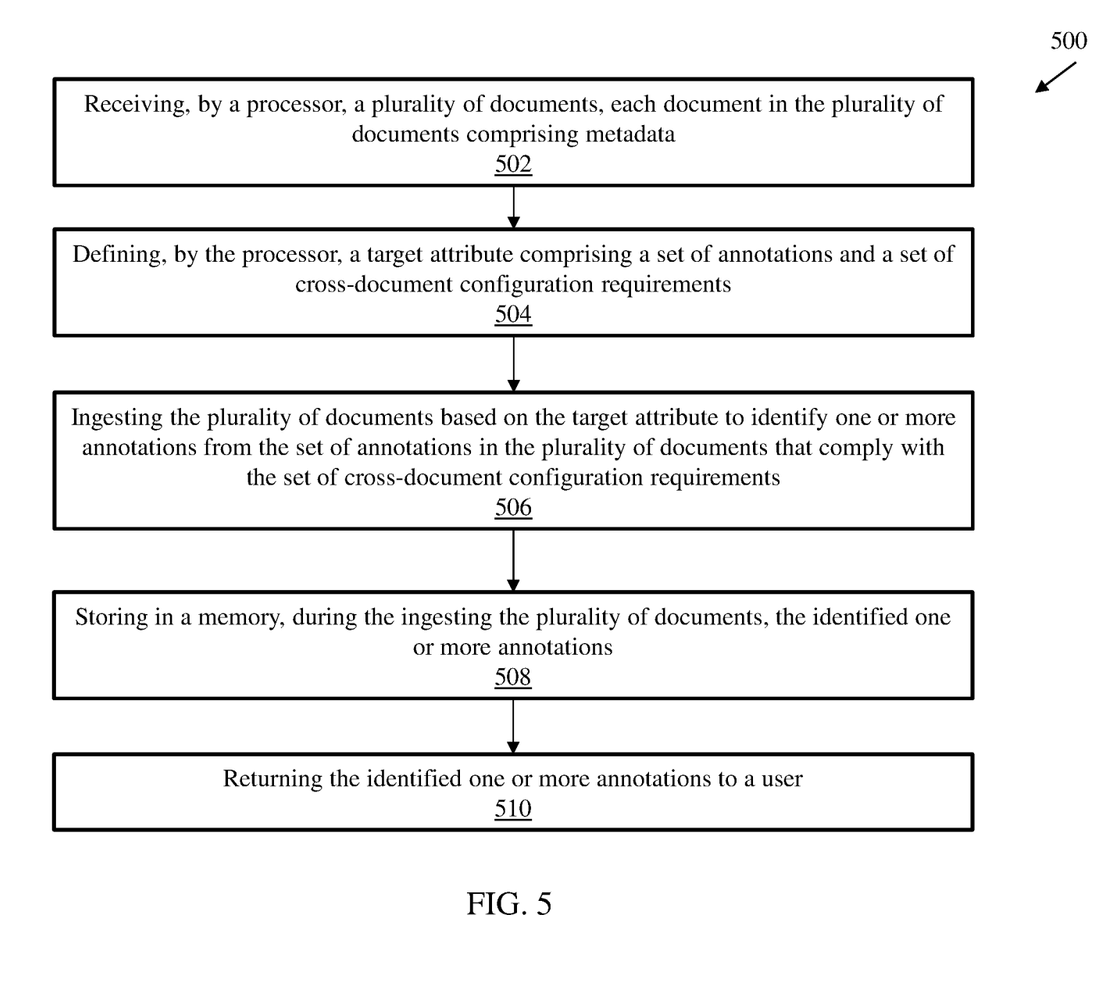
FIG. 5 depicts a flow diagram of a method for supporting document and cross-document post-processing configurations and runtime execution within a single cartridge according to one or more embodiments of the invention.

FIG. 5 depicts a flow diagram of a method for supporting document and cross-document post-processing configurations and runtime execution within a single cartridge according to one or more embodiments of the invention. The method 500 includes receiving, by a processor, a plurality of documents, each document in the plurality of documents comprising metadata, as shown in block 502. At block 504, the method 500 includes defining, by the processor, a target attribute comprising a set of annotations and a set of cross-document configuration requirements. Also, at block 506, the method 500 include ingesting the plurality of documents based on the target attribute to identify one or more annotations from the set of annotations in the plurality of documents that comply with the set of cross-document configuration requirements. The method 500, at block 508, includes storing in a memory, during the ingesting the plurality of documents, the identified one or more annotations. And at block 510, the method 500 includes returning the identified one or more annotations to a user.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor, a plurality of documents;
defining, by the processor, a target attribute comprising a set of annotations and a set of cross-document configuration requirements, wherein the set of cross-document configuration requirements comprise metadata values, wherein the metadata values comprise a range document dates and a set of document types;
ingesting the plurality of documents based on the target attribute to identify one or more annotations from the set of annotations in the plurality of documents that comply with the set of cross-document configuration requirements;
determining a confidence score for each of the one or more annotations in the set of annotations based on source documents dates, wherein the confidence score is higher for annotations occurring closer in time;
storing in a memory, during the ingesting the plurality of documents, the identified one or more annotations; and
returning the identified one or more annotations to a user.

2. The computer-implemented method of claim 1, wherein the target attribute is defined within a single natural language processing (NLP) cartridge.

3. The computer-implemented method of claim 2, wherein the identified one or more annotations are returned to the user responsive to a post-processing call to the single NLP cartridge.

4. The computer-implemented method of claim 1, wherein the metadata values further comprise a document type.

5. The computer-implemented method of claim 1, wherein the metadata values further comprise a document author.

6. A system comprising:
a processor communicatively coupled to a memory, the processor configured to:
receive a plurality of documents;
define a target attribute comprising a set of annotations and a set of cross-document configuration requirements, wherein the set of cross-document configuration requirements comprise metadata values, wherein the metadata values comprise a range document dates and a set of document types;
ingest the plurality of documents based on the target attribute to identify one or more annotations from the set of annotations in the plurality of documents that comply with the set of cross-document configuration requirements;
determine a confidence score for each of the one or more annotations in the set of annotations based on source documents dates, wherein the confidence score is higher for annotations occurring closer in time;
store in the memory, during the ingesting the plurality of documents, the identified one or more annotations; and
return the identified one or more annotations to a user.

7. The system of claim 6, wherein the target attribute is defined within a single natural language processing (NLP) cartridge.

8. The system of claim 6, wherein the metadata values further comprise a document type.

9. The system of claim 6, wherein the metadata values further comprise a document author.

10. A computer program product comprising a computer readable storage medium having program instructions embodied therewith, the program instructions executable by a processor to cause the processor to perform a method comprising:
receiving, by the processor, a plurality of documents;
defining, by the processor, a target attribute comprising a set of annotations and a set of cross-document configuration requirements, wherein the set of cross-document configuration requirements comprise metadata values, wherein the metadata values comprise a range document dates and a set of document types;
ingesting the plurality of documents based on the target attribute to identify one or more annotations from the set of annotations in the plurality of documents that comply with the set of cross-document configuration requirements;
determining a confidence score for each of the one or more annotations in the set of annotations based on source documents dates, wherein the confidence score is higher for annotations occurring closer in time;
storing in a memory, during the ingesting the plurality of documents, the identified one or more annotations; and
returning the identified one or more documents to a user.

11. The computer program product of claim 10, wherein the target attribute is defined within a single natural language processing (NLP) cartridge.

12. The computer program product of claim 11, wherein the identified one or more annotations are returned to the user responsive to a post-processing call to the single NLP cartridge.

13. The computer program product of claim 10, wherein the metadata values further comprise a document type.

14. The computer program product of claim 10, wherein the metadata values further comprise a document author.

* * * * *